(12) United States Patent
Tsuji et al.

(10) Patent No.: US 6,534,586 B2
(45) Date of Patent: Mar. 18, 2003

(54) FLAME-RETARDANT RUBBER COMPOSITION AND FLAME-RETARDANT ELASTOMER

(75) Inventors: Shoei Tsuji, Tokyo (JP); Junji Ayukawa, Tokyo (JP); Toshiyuki Hayakawa, Tokyo (JP); Minoru Tanaka, Tokyo (JP); Fumio Tsutsumi, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/949,121

(22) Filed: Sep. 10, 2001

(65) Prior Publication Data

US 2002/0058746 A1 May 16, 2002

(30) Foreign Application Priority Data

Sep. 20, 2000 (JP) ........................................ 2000-284983

(51) Int. Cl.$^7$ ............................................... C08L 45/00
(52) U.S. Cl. ...................... 524/553; 524/548; 524/549; 524/436; 525/205; 525/207; 525/210; 525/240
(58) Field of Search ................................ 524/436, 553, 524/555, 556, 570, 579, 548, 549; 525/210, 218, 221, 231, 240, 205, 207

(56) References Cited

U.S. PATENT DOCUMENTS

| | | | | |
|---|---|---|---|---|
| 5,418,272 A | * | 5/1995 | Kawabata et al. | .......... 524/436 |
| 6,403,742 B2 | * | 1/2002 | Oshima et al. | ............. 526/281 |

FOREIGN PATENT DOCUMENTS

| | | |
|---|---|---|
| EP | 0 295 076 | 12/1988 |
| EP | 0 832 926 | 4/1998 |
| EP | 1 033 384 | 9/2000 |
| EP | 1 113 027 | 7/2001 |
| JP | 10-330429 | 12/1998 |

OTHER PUBLICATIONS

ACS Abs. No. 1995:584227 of Japanese 07062158, published Mar.1995.*

Hackh's Chemical Dictionary, 4th ed., J. Grant (ed.), McGraw–Hill, N. Y., 1969, 199.*

* cited by examiner

*Primary Examiner*—Fred Teskin
(74) *Attorney, Agent, or Firm*—Oblon, Spivak, McClelland, Maier & Neustadt, P.C.

(57) ABSTRACT

The invention provides a flame-retardant rubber composition which may form a vulcanizate of an elastomer whose deterioration of mechanical strength is little to enjoy excellent mechanical properties, even when a nonhalogenated flame retardant is contained in a high proportion in the composition, and a flame-retardant elastomer obtained therefrom. The flame-retardant rubber composition contains (A) an olefin copolymer having a functional group, which comprises (a-1) a structural unit derived from ethylene, (a-2) a structural unit derived from an α-olefin compound having 3 to 10 carbon atoms, (a-3) a structural unit derived from a functional group-containing unsaturated compound, and optionally (a-4) a structural unit derived from a nonconjugated diene compound, and has an intrinsic viscosity [η] of 0.1 to 10 dL/g as measured in decalin at 135° C., (B) a vulcanizing agent and/or a crosslinking agent and (C) a nonhalogenated flame retardant. The flame-retardant elastomer is obtained by subjecting the flame-retardant rubber composition to a vulcanizing treatment.

11 Claims, No Drawings

FLAME-RETARDANT RUBBER COMPOSITION AND FLAME-RETARDANT ELASTOMER

BACKGROUND OF THE INVENTION

1. Field of the Invention

The present invention relates to a flame-retardant rubber composition and a flame-retardant elastomer containing an olefin copolymer as a base, and particularly to a flame-retardant rubber composition from which an elastomer having excellent mechanical properties is provided even when a nonhalogenated flame retardant is contained in plenty, and a flame-retardant elastomer obtained therefrom.

2. Description of the Background Art

In a field of rubber, elastomers making use of a nonhalogenated flame retardant have been required from the viewpoint of environmental protection in recent years.

A hydrous compound is generally used as a nonhalogenated flame retardant, and it is necessary to incorporate the hydrous compound in a comparatively great amount in order to achieve sufficient flame retardancy in an elastomer. However, an elastomer containing the hydrous compound in a high proportion involves a problem that the mechanical strength of the elastomer is deteriorated.

SUMMARY OF THE INVENTION

It is an object of the present invention to provide a flame-retardant rubber composition which may form a vulcanizate of an elastomer whose deterioration of mechanical strength is little to enjoy excellent mechanical properties, even when a nonhalogenated flame retardant is contained in a high proportion in the composition.

Another object of the present invention is to provide a flame-retardant elastomer, a vulcanized product, whose deterioration of mechanical strength is little to enjoy excellent mechanical properties even when a nonhalogenated flame retardant is contained in a high proportion.

According to the present invention, the following flame-retardant rubber compositions are provided, whereby the first object of the present invention is achieved.

1. A flame-retardant rubber composition comprising:
   (A) an olefin copolymer having a functional group, which comprises (a-1) a structural unit derived from ethylene, (a-2) a structural unit derived from an α-olefin compound having 3 to 10 carbon atoms, (a-3) a structural unit derived from a functional group-containing unsaturated compound, and optionally (a-4) a structural unit derived from a nonconjugated diene compound, and has an intrinsic viscosity $|\eta|$ of 0.1 to 10 dL/g as measured in decalin® (decahydronaphthalene) at 135° C.;
   (B) a vulcanizing agent and/or a crosslinking agent; and
   (C) a nonhalogenated flame retardant.

2. A flame-retardant rubber composition according to the item 1, wherein the functional group-containing unsaturated compound, from which the structural unit (a-3) in the olefin copolymer (A) having the functional group is derived, is a compound represented by the following formula (1) and/or the following formula (2): Formula (1):

$$CH{=}CR^1{-}(CH_2)_n{-}X$$

wherein $R^1$ means a hydrogen atom or a hydrocarbon group having 1 to 10 carbon atoms, X denotes a functional group represented by $-OR^2$, $-COOH$, $-NHR^2$ or $-CONHR^2$ ($R^2$ being a hydrogen atom or a hydrocarbon group having 1 to 10 carbon atoms), and n is an integer of 0 to 6;

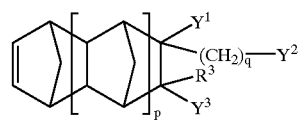

Formula (2)

wherein $R^3$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or a functional group represented by $-OR^2$, $-COOH$, $-NHR^2$ or $-CONHR^2$ ($R^2$ being a hydrogen atom or a hydrocarbon group having 1 to 10 carbon atoms), at least one of $Y^1$, $Y^2$ and $Y^3$ is the functional group, at least two of $Y^1$, $Y^2$ and $Y^3$ may be an acid anhydride group ($-CO-O-CO-$) or an imide group ($-CO-NH-CO-$) formed by being bonded to each other when they are the functional groups, p is an integer of 0 to 2, and q is an integer of 0 to 5.

3. A flame-retardant rubber composition according to the item 2, wherein the functional group X in the formula (1) or said at least one functional group of $Y^1$, $Y^2$ and $Y^3$ in the formula (2) is a $-COOH$ group.

4. A flame-retardant rubber composition according to any one of the items 1 to 3, wherein in the olefin copolymer (A) having the functional group, proportions of the structural unit (a-1), the structural unit (a-2), the structural unit (a-3) and the structural unit (a-4) are 35 to 90 mol %, 5 to 50 mol %, 0.01 to 5 mol % and 0 to 10 mol %, respectively.

5. A flame-retardant rubber composition according to any one of the items 1 to 4, which further comprises (D) an ethylene.α-olefin copolymer having no functional group.

6. A flame-retardant rubber composition according to any one of the items 1 to 5, wherein the nonhalogenated flame retardant (C) is contained in a proportion of at least 5 parts by mass per 100 parts by mass in total of the olefin copolymer (A) having the functional group and the ethylene.α-olefin copolymer (D) having no functional group.

According to the present invention, a flame-retardant elastomer obtained by subjecting the flame-retardant rubber composition according to any one of the items 1 to 6 to a vulcanizing treatment is provided, whereby the second object of the present invention is achieved.

According to the flame-retardant rubber compositions, the olefin copolymer, which is an elastomer-forming component, has the functional group in its structural unit, whereby the coexisting nonhalogenated flame retardant is chemically stabilized. Therefore, the degree of deterioration of mechanical strength in the resultant elastomers, which is caused by the nonhalogenated flame retardant, becomes little even when the nonhalogenated flame retardant is incorporated in a high proportion, so that the elastomers can be provided as those having high flame retardancy and excellent mechanical properties.

DETAILED DESCRIPTION OF THE PREFERRED EMBODIMENTS

The embodiments of the present invention will hereinafter be described in detail.

The flame-retardant rubber compositions according to the present invention comprise, as essential components the following components (A), (B) and (C).

The component (A) is an olefin copolymer having a functional group, which contains (a-1) a structural unit (hereinafter may also be referred to as "structural unit (a-1)") derived from ethylene, (a-2) a structural unit (hereinafter may also be referred to as "structural unit (a-2)") derived from an α-olefin compound having 3 to 10 carbon atoms, (a-3) a structural unit (hereinafter may also be referred to as "structural unit (a-3)") derived from a functional group-containing unsaturated compound, and optionally (a-4) a structural unit (hereinafter may also be referred to as "structural unit (a-4)") derived from a nonconjugated diene compound, and has an intrinsic viscosity [η] of 0.1 to 10 dL/g as measured in decalin at 135° C.

The component (B) is a vulcanizing agent and/or a crosslinking agent.

The component (C) is a nonhalogenated flame retardant.

The flame-retardant rubber compositions according to the present invention may contain an ethylene.α-olefin copolymer having no functional group as a component (D) within limits not impeding the objects of the present invention.

In the olefin copolymer (A) having the functional group used in the present invention, the structural unit (a-1) derived from ethylene is preferably contained in a range of 35 to 90 mol %, more preferably 40 to 85 mol %, particularly preferably 45 to 80 mol %, based on the whole structural unit in the component (A).

If the proportion of the structural unit (a-1) contained is lower than 35 mol %, it is difficult to copolymerize a functional group-containing cycloolefin represented by the formula (2), which is suitable for use in forming the structural unit (a-3), because the proportion of ethylene copolymerized for preparing the olefin copolymer (A) is too low. As a result, it is difficult to obtain an olefin copolymer (A) having a suitable functional group, and moreover an elastomer finally obtained from the resulting copolymer may be deteriorated in mechanical strength and abrasion resistance in some cases.

On the other hand, if the proportion of the structural unit (a-1) exceeds 90 mol %, the elasticity of an elastomer obtained from the resulting copolymer may become insufficient in some cases.

The structural unit (a-2) in the component (A) is a structural unit derived from an α-olefin compound having 3 to 10 carbon atoms. As examples of the α-olefin compound having 3 to 10 carbon atoms as used herein, may be mentioned propylene, 1-butene, 1-pentene, 4-methylpentene-1,1-hexene, 1-heptene, 1-octene, 1-decene, styrene and p-methylstyrene. Among these, propylene, 1-butene, 1-hexene and 1-octene are preferred, with propylene and 1-butene being particularly preferred. These olefin compounds may be used either singly or in any combination thereof.

When the α-olefin compound, which forms the structural unit (a-2) in the preparation of the copolymer of the component (A) is used, the copolymerizability of the monomer composition for obtaining the component (A) becomes satisfactory.

The structural unit (a-2) in the component (A) is preferably contained in a range of 5 to 50 mol %, more preferably 10 to 45 mol %, particularly preferably 15 to 40 mol % based on the whole structural unit.

If the proportion of the structural unit (a-2) contained is lower than 5 mol %, the elasticity of an elastomer obtained from the resulting copolymer may become insufficient in some cases.

On the other hand, if the proportion of the structural unit (a-2) exceeds 50 mol %, an elastomer obtained from the resulting copolymer may be deteriorated in mechanical strength and abrasion resistance in some cases.

The structural unit (a-3) in the component (A) is a structural unit derived from a functional group-containing unsaturated compound. As specific examples of such a functional group-containing unsaturated compound, may be mentioned those represented by the formula (1) and/or the formula (2).

In the formula (1), $R^1$ means a hydrogen atom or a hydrocarbon group having 1 to 10 carbon atoms, X denotes a functional group represented by $-OR^2$, $-COOH$, $-NHR^2$ or $-CONHR^2$, in which $R^2$ is a hydrogen atom or a hydrocarbon group having 1 to 10 carbon atoms. n is an integer of 0 to 6.

As examples of the functional group-containing unsaturated compound represented by the formula (1), may be mentioned methyl vinyl ether, ethyl vinyl ether, acrylic acid, acrylamide, N-methylacrylamide, N-ethyl-acrylamide, allyl alcohol, allyl methyl ether, allyl ethyl ether, vinylacetic acid, allylamine, N-methylallylamine, N-ethylallylamine, vinylacetic amide, N-methylvinylacetic amide, N-ethylvinylacetic amide, methacrylic acid and methacrylamide.

Among these, acrylic acid, acrylamide, N-methylacrylamide, N-ethylacrylamide, allyl alcohol, vinylacetic acid, allylamine, N-methylallylamine, N-ethylallylamine, vinylacetic amide, N-methylvinylacetic amide and N-ethylvinylacetic amide are preferred.

In the formula (2), $R^3$ means a hydrogen atom or a hydrocarbon group having 1 to 10 carbon atoms. $Y^1$, $Y^2$ and $Y^3$ denote, independently of one another, a hydrogen atom, a hydrocarbon group having 1 to 10 carbon atoms or a functional group represented by $-OR^2$, $-COOH$, $-NHR^2$ or $-CONHR^2$ ($R^2$ being a hydrogen atom or a hydrocarbon group having 1 to 10 carbon atoms). At least one of $Y^1$, $Y^2$ and $Y^3$ is the functional group, and at least two of $Y^1$, $Y^2$ and $Y^3$ may be an acid anhydride group ($-CO-O-CO-$) or an imide group ($-CO-NH-CO-$) formed by being bonded to each other when they are the functional groups. p is an integer of 0 to 2, and q is an integer of 0 to 5.

In the formulae (1) and (2), as examples of the hydrocarbon group having 1 to 10 carbon atoms in each of $R^1$, $R^2$ and $R^3$, may be mentioned alkyl groups, i.e., methyl, ethyl, propyl, butyl, pentyl, hexyl, heptyl, octyl, nonyl and decyl groups.

As examples of $Y^1$, $Y^2$ and $Y^3$, may be mentioned a hydrogen atom, hydrocarbon groups (specifically, alkyl groups) having 1 to 10 carbon atoms, a hydroxyl group, a methoxy group, an ethoxy group, a carboxyl group, an amino group, an N-methylamino group, an N-ethylamino group, an amide group, an N-methylamide group and an N-ethylamide group.

In the formula (2), the number p of repetitions is an integer of 0 to 2. If this number p is 3 or greater, it is difficult to copolymerize such a functional group-containing unsaturated compound with other monomers. On the other hand, a compound in which the number p of repetitions is 0 or 1 is preferred in that its copolymerization reaction is easy, with a compound in which p is 0 being particularly preferred.

The functional group-containing unsaturated compound represented by the formula (2) is prepared by condensing cyclopentadiene with a functional group-containing unsaturated compound by the Diels-Alder reaction.

As specific examples of the functional group-containing unsaturated compound represented by the formula (2), may be mentioned the following compounds:

(those in which p in the formula (2) is 0)
- 5,6-dimethyl-5,6-dihydroxy-bicyclo[2.2.1]-2-heptene,
- 5,6-dimethyl-5,6-dicarboxy-bicyclo[2.2.1]-2-heptene,
- 5,6-diethyl-5,6-dicarboxy-bicyclo[2.2.1]-2-heptene,
- 5,6-dimethyl-5,6-bis(carboxymethyl)-bicyclo[2.2.1]-2-heptene,
- 5,6-diethyl-5,6-bis(carboxymethyl)-bicyclo[2.2.1]-2-heptene,
- 5,6-dimethyl-5,6-bis(hydroxymethyl)-bicyclo[2.2.1]-2-heptene,
- 5,6-diethyl-5,6-bis(hydroxymethyl)-bicyclo[2.2.1]-2-heptene,
- 5,6-dimethyl-5,6-bis(aminomethyl)-bicyclo[2.2.1]-2-heptene,
- 5,6-diethyl-5,6-bis(aminomethyl)-bicyclo[2.2.1]-2-heptene,
- 5,6-dimethyl-5,6-bis(aminopropyl)-bicyclo[2.2.1]-2-heptene,
- 5,6-dimethyl-5,6-bis(aminocarbonyl)-bicyclo[2.2.1]-2-heptene,
- 5,6-dimethyl-5,6-bis(N-methylaminocarbonyl)-bicyclo[2.2.1]-2-heptene,
- 5,6-dimethyl-5,6-bis(N-propylaminocarbonyl)-bicyclo[2.2.1]-2-heptene,
- 5,6-diethyl-5,6-bis(aminocarbonyl)-bicyclo[2.2.1]-2-heptene,
- 5,6-diethyl-5,6-bis(N-ethylaminocarbonyl)-bicyclo[2.2.1]-2-heptene,
- 5,6-dimethyl-bicyclo[2.2.1]-2-heptene-5,6-dicarboxylic acid imide,
- 5-methyl-5-hydroxy-bicyclo[2.2.1]-2-heptene,
- 5-methyl-5-carboxy-bicyclo[2.2.1]-2-heptene,
- 5-ethyl-5-carboxy-bicyclo[2.2.1]-2-heptene,
- 5-carboxy-5-carboxymethyl-bicyclo[2.2.1]-2-heptene,
- 5-methyl-5-hydroxymethyl-bicyclo[2.2.1]-2-heptene,
- 5-ethyl-5-hydroxymethyl-bicyclo[2.2.1]-2-heptene,
- 5-methyl-5-carboxymethyl-bicyclo[2.2.1]-2-heptene,
- 5-ethyl-5-carboxymethyl-bicyclo[2.2.1]-2-heptene,
- 5-methyl-5-aminomethyl-bicyclo[2.2.1]-2-heptene,
- 5-ethyl-5-aminomethyl-bicyclo[2.2.1]-2-heptene,
- 5-methyl-5-aminopropyl-bicyclo[2.2.1]-2-heptene,
- 5-methyl-5-aminocarbonyl-bicyclo[2.2.1]-2-heptene,
- 5-methyl-5-N-methylaminocarbonyl-bicyclo[2.2.1]-2-heptene,
- 5-methyl-5-N-propylaminocarbonyl-bicyclo[2.2.1]-2-heptene,
- 5-ethyl-5-aminocarbonyl-bicyclo[2.2.1]-2-heptene,
- 5-ethyl-5-N-ethylaminocarbonyl-bicyclo[2.2.1]-2-heptene, (those in which p in the formula (2) is 1)
- 8,9-dimethyl-8,9-dicarboxy-tetracyclo[$4.4.0.1^{2,5}.1^{7,10}$]-3-dodecene,
- 8,9-diethyl-8,9-dicarboxy-tetracyclo[$4.4.0.1^{2,5}.1^{7,10}$]-3-dodecene,
- 8,9-dimethyl-8,9-bis(hydroxymethyl)-tetracyclo[$4.4.0.1^{2,5}.1^{7,10}$]-3-dodecene,
- 8,9-diethyl-8,9-bis(hydroxymethyl)-tetracyclo[$4.4.0.1^{2,5}.1^{7,10}$]-3-dodecene,
- 8,9-dimethyl-8,9-bis(aminomethyl)-tetracyclo[$4.4.0.1^{2,5}.1^{7,10}$]-3-dodecene,
- 8,9-diethyl-8,9-bis(aminomethyl)-tetracyclo[$4.4.0.1^{2,5}.1^{7,10}$]-3-dodecene,
- 8,9-dimethyl-8,9-bis(aminocarbonyl)-tetracyclo[$4.4.0.1^{2,5}.1^{7,10}$]-3-dodecene,
- 8,9-dimethyl-8,9-bis(N-methylaminocarbonyl)-tetracyclo[$4.4.0.1^{2,5}.1^{7,10}$]-3-dodecene,
- 8,9-diethyl-8,9-bis(aminocarbonyl)-tetracyclo[$4.4.0.1^{2,5}.1^{7,10}$]-3-dodecene,
- 8,9-diethyl-8,9-bis(N-ethylaminocarbonyl)-tetracyclo[$4.4.0.1^{2,5}.1^{7,10}$]-3-dodecene,
- 8-methyl-8-carboxy-tetracyclo[$4.4.0.1^{2,5}.1^{7,10}$]-3-dodecene,
- 8-ethyl-8-carboxy-tetracyclo[$4.4.0.1^{2,5}.1^{7,10}$]-3-dodecene,
- 8-methyl-8-hydroxymethyl-tetracyclo[$4.4.0.1^{2,5}.1^{7,10}$]-3-dodecene,
- 8-ethyl-8-hydroxymethyl-tetracyclo[$4.4.0.1^{2,5}.1^{7,10}$]-3-dodecene,
- 8-methyl-8-aminomethyl-tetracyclo[$4.4.0.1^{2,5}.1^{7,10}$]-3-dodecene,
- 8-ethyl-8-aminomethyl-tetracyclo[$4.4.0.1^{2,5}.1^{7,10}$]-3-dodecene,
- 8-methyl-8-aminocarbonyl-tetracyclo[$4.4.0.1^{2,5}.1^{7,10}$]-3-dodecene,
- 8-methyl-8-N-methylaminocarbonyl-tetracyclo[$4.4.0.1^{2,5}.1^{7,10}$]-3-dodecene,
- 8-ethyl-8-aminocarbonyl-tetracyclo[$4.4.0.1^{2,5}.1^{7,10}$]-3-dodecene, and
- 8-ethyl-8-N-ethylaminocarbonyl-tetracyclo[$4.4.0.1^{2,5}.1^{7,10}$]-3-dodecene.

The structural unit (a-3) in the component (A) is preferably contained in a range of 0.01 to 5 mol %, more preferably 0.05 to 4 mol %, particularly preferably 0.1 to 3.5 mol % based on the whole structural unit in the component (A).

If the proportion of the structural unit (a-3) contained is lower than 0.01 mol %, an elastomer obtained from the resulting copolymer may be deteriorated in adhesion to, compatibility with or coating property on metals, and other elastomers and resins than olefin polymers in some cases.

On the other hand, if the proportion of the structural unit (a-3) exceeds 5 mol %, the copolymerization of the monomer forming the structural unit (a-3) with other monomers than the olefin monomer may become difficult in some cases, and an elastomer obtained from the resulting copolymer tends to have insufficient rubber elasticity. In addition, as the result that the amount of a polymerization catalyst used is required to be increased, a high-molecular weight copolymer may be hard to be formed in some cases.

The structural unit (a-4) in the component (A) is a structural unit derived from a nonconjugated diene compound and contained as a component of the copolymer constituting the component (A) as needed.

As specific examples of the nonconjugated diene compound from which the structural unit (a-4) is derived, may be mentioned:

(1) linear acyclic dienes such as 1,4-hexadiene, 1,6-hexadiene and 1,5-hexadiene, (2) branched-chain acyclic dienes such as 5-methyl-1,4-hexadiene, 3,7-dimethyl-1,6-octadiene, 5,7-dimethyl-1,6-octadiene, 3,7-dimethyl-1,7-octadiene, 7-methyl-1,6-octadiene and dihydromyrcene, and (3) alicyclic dienes such as tetrahydroindene, methyltetrahydroindene, dicyclopentadiene, bicyclo

[2.2.1]-hept-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene.

These nonconjugated diene compounds may be used either singly or in any combination thereof.

As examples of preferred compounds among the above-mentioned nonconjugated diene compounds, may be mentioned 1,4-hexadiene, dicyclopentadiene and 5-ethylidene-2-norbornene.

The structural unit (a-4) is preferably contained in a proportion of 0 to 10 mol %, more preferably 0 to 8 mol %, particularly preferably 0 to 5 mol % based on the whole structural unit in the component (A). If the proportion of the structural unit (a-4) contained exceeds 10 mol %, the catalytic activity in a copolymerization reaction by which the component (A) is prepared is markedly lowered. It is hence not preferable to contain the structural unit (a-4) in such a high proportion from the viewpoint of cost.

The functional group-containing olefin copolymer (A) containing the structural units (a-1) to (a-4) has an intrinsic viscosity [η] ranging from 0.1 to 10 dL/g, preferably from 0.1 to 7 dL/g, particularly preferably from 0.1 to 5 dL/g as measured in decalin at 135° C.

Any other copolymer having an intrinsic viscosity [η] lower than 0.1 dL/g becomes difficult to knead it with other olefin copolymer rubbers. On the other hand, if the intrinsic viscosity [η] exceeds 10 dL/g, such a copolymer tends to provide an elastomer deteriorated in molding and processing ability.

The functional group-containing olefin copolymer (A) in the present invention preferably has a weight average molecular weight Mw of 1,000 to 3,000,000, more preferably 3,000 to 1,000,000, particularly preferably 5,000 to 700,000 in terms of polystyrene as measured at 135° C. by gel permeation chromatography making use of o-dichlorobenzene as a solvent. The olefin copolymer (A) also preferably has a number average molecular weight Mn of 500 to 1,000,000, more preferably 1,000 to 500,000, particularly preferably 2,000 to 300,000 in terms of polystyrene.

The glass transition temperature of the functional group-containing olefin copolymer (A) is preferably −90 to 50° C., more preferably −70 to 10° C. Such a copolymer can provide an elastomer having sufficient elasticity. The glass transition temperature of the olefin copolymer (A) can be measured by means of a differential scanning calorimeter (DSC).

In the present invention, a vulcanizing agent and/or a crosslinking agent is used as the component (B).

No particular limitation is imposed on the vulcanizing agent used, and examples thereof include sulfur such as sulfur powder, precipitated sulfur, colloidal sulfur and insoluble sulfur; inorganic vulcanizing agents such as sulfur chloride, selenium and tellurium; and sulfur-containing organic compounds such as morpholine disulfide, alkylphenol disulfides, thiuram disulfides and dithiocarbamates. These vulcanizing agents may be used either singly or in any combination thereof.

The proportion of the vulcanizing agent incorporated is generally 0.1 to 10 parts by mass, preferably 0.5 to 5 parts by mass per 100 parts by mass of an elastomer component.

A vulcanization accelerator may also be used in combination with the vulcanizing agent.

Examples of the vulcanization accelerator include aldehyde ammonia type vulcanization accelerators such as hexamethylenetetramine; guanidine type vulcanization accelerators such as diphenylguanidine, di-(o-tolyl)-guanidine and o-tolylbiguanide; thiourea type vulcanization accelerators such as thiocarboanilide, di-(o-tolyl)thiourea, N,N'-diethylthiourea, tetramethyl-thiourea, trimethylthiourea and dilaurylthiourea; thiazole type vulcanization accelerators such as mercaptobenzo-thiazole, dibenzothiazyl disulfide, 2-(4-morpholinothio)-benzothiazole, 2-(2,4-dinitrophenyl) mercaptobenzothiazole and (N,N'-diethylthiocarbamoylthio)benzothiazole; sulfenamide type vulcanization accelerators such as N-t-butyl-2-benzothiazyl sulfenamide, N,N'-dicyclohexyl-2-benzothiazyl sulfenamide, N,N'-diisopropyl-2-benzothiazyl sulfenamide and N-cyclohexyl-2-benzothiazyl sulfenamide; thiuram type vulcanization accelerators such as tetramethylthiuram disulfide, tetraethylthiuram disulfide, tetra-n-butylthiuram disulfide, tetramethylthiuram monosulfide and dipentamethylenethiuram tetrasulfide; carbamate type vulcanization accelerators such as zinc dimethylthiocarbamate, zinc diethylthiocarbamate, zinc di-n-butylthiocarbamate, zinc ethylphenyldithiocarbamate, sodium dimethyldithiocarbamate, copper dimethyl-dithiocarbamate, tellurium dimethylthiocarbamate and iron dimethylthiocarbamate; and xanthogenate type vulcanization accelerators such as zinc butylthioxanthogenate. These vulcanization accelerators may be used either singly or in any combination thereof.

The amount of the vulcanization accelerator incorporated is generally 0.1 to 20 parts by mass, preferably 0.2 to 10 parts by mass per 100 parts by mass of the elastomer component.

A vulcanization acceleration aid may also be added, as needed, in addition to the vulcanizing agent and vulcanization accelerator.

Examples of such a vulcanization acceleration aid include metal oxides such as magnesium oxide, zinc oxide (zinc white), litharge, red lead and lead white; and organic acids and salts thereof such as stearic acid, oleic acid and zinc stearate. Among these, zinc oxide and stearic acid are particularly preferred. These vulcanization acceleration aids may be used either singly or in any combination thereof.

The amount of the vulcanization acceleration aid incorporated is generally 0.5 to 20 parts by mass per 100 parts by mass of the elastomer component.

Examples of the crosslinking agent used as the component (B) in the present invention include organic peroxides such as 1,1-di-t-butylperoxy-3,3,5-trimethyl-cyclohexane, di-t-butyl peroxide, dicumyl peroxide, t-butylcumyl peroxide, 2,5-dimethyl-2,5-di(t-butylperoxy)-hexane and 1,3-bis (t-butylperoxyisopropyl)benzene. These crosslinking agents may be used either singly or in any combination thereof.

The amount of the crosslinking agent incorporated is generally 0.1 to 15 parts by mass, preferably 0.5 to 10 parts by mass per 100 parts by mass of the elastomer component.

A crosslinking aid may also be used in combination with the crosslinking agent.

Examples of the crosslinking aid include sulfur and sulfur compounds such as sulfur and dipentamethylenethiuram tetrasulfide; polyfunctional monomers such as ethylene di(meth)acrylate, polyethylene di(meth)acrylate, divinylbenzene, diallyl phthalate, triallyl cyanurate, m-phenylene bismaleimide and toluylene bismaleimide; and oxime compounds such as p-quinone oxime and p,p'-dibenzoylquinone oxime. These crosslinking aids may be used either singly or in any combination thereof.

The amount of the crosslinking aid incorporated is generally 0.5 to 20 parts by mass per 100 parts by mass of the elastomer component.

In the present invention, a nonhalogenated flame retardant is used as the component (C). Examples of the nonhalogenated flame retardant include inorganic flame retardants and organic flame retardants.

Specific examples of the inorganic flame retardants include aluminum hydroxide, magnesium hydroxide, zirconium hydroxide, basic magnesium carbonate, dolomite, hydrotalcite, calcium hydroxide, barium hydroxide, hydrates of tin oxide, hydrates of inorganic metal compounds such as borax, red phosphorus, and ammonium polyphosphate. Among these inorganic flame retardants, aluminum hydroxide and magnesium hydroxide are preferred.

Examples of the organic flame retardants include organic phosphates such as triphenyl phosphate, tricresyl phosphate, resorcinol bis(diphenyl)phosphate, aromatic phosphates and aromatic condensed phosphates, and besides ammonium amide polyphosphate. Among these organic flame retardants, the organic phosphates are preferred.

These inorganic and organic flame retardants may be used either singly or in any combination thereof. In particular, when ammonium polyphosphate type flame retardant, which is an inorganic flame retardant, or a phosphorus-containing flame retardant such as an organic phosphate is used in combination with any other flame retardant, a far excellent flame-retardant effect is achieved.

When the inorganic flame retardant is used as the component (C), the surface of the flame retardant may be subjected to a surface treatment with a fatty acid such as stearic acid, oleic acid or palmitic acid, or a salt thereof, paraffin, natural wax, synthetic wax such as polyethylene wax, or a modified product thereof, an organic borane, an organic titanate, a silane coupling agent, or the like. It is particularly preferred that the surface treatment be conducted with the silane coupling agent.

Into the flame-retardant rubber composition, may be incorporated a silicone compound, quartz glass or the like for enhancing the flame-retardant effect by the flame retardant contained; water glass, frit or the like as a flame retardant aid; and short fiber of silicon nitride, or the like for preventing drip.

The proportion of the nonhalogenated flame retardant (C) contained in the flame-retardant rubber composition according to the present invention is at least 5 parts by mass, preferably at least 25 parts by mass, more preferably at least 50 parts by mass per 100 parts by mass of the elastomer-forming component, specifically, the functional group-containing olefin copolymer (A) (total mass of the olefin copolymer (A) and the ethylene.α-olefin copolymer (D) having no functional group when the olefin copolymer (D) is used).

If the proportion of the component (C) contained is lower than 5 parts by mass, an elastomer obtained from the resulting rubber composition cannot have sufficient flame retardancy.

No particular limitation is imposed on the upper limit of the proportion of the component (C) contained. However, it is generally at most 500 parts by mass, preferably not more than 450 parts by mass, more preferably not more than 400 parts by mass per 100 parts by mass of the elastomer-forming component.

In the flame-retardant rubber composition according to the present invention, may be incorporated a reinforcing material, a filler, a softening agent and other additives.

Examples of the reinforcing material include carbon black such as SRF, FEF, HAF, ISAF, SAF, FT and MT, and examples of the filler include inorganic fillers such as white carbon, finely particulate magnesium silicate, calcium carbonate, magnesium carbonate, clay and talc. These reinforcing materials and fillers may be used either singly or in any combination thereof.

The amount of the reinforcing material or filler incorporated is generally 10 to 200 parts by mass, preferably 10 to 100 parts by mass per 100 parts by mass of the elastomer component.

Preferable examples of the softening agent include process oils such as aromatic oil, naphthenic oil and paraffin oil commonly used as compounding additives for rubber, vegetable oils such as coconut oil, and synthetic oils such as alkylbenzene oil. Among these, the process oils are preferred, with paraffin oil being particularly preferred. These softening agents may be used either singly or in any combination thereof.

The amount of the softening agent incorporated is generally 10 to 130 parts by mass, preferably 20 to 100 parts by mass per 100 parts by weight of the elastomer component.

The flame-retardant rubber composition according to the present invention contains the functional group-containing olefin copolymer (A) as an elastomer forming component, and this olefin copolymer (A) has the structural unit (a-3) having the functional group. Accordingly, the functional group in this structural unit (a-3) is present in a three-dimensional structure derived from the olefin copolymer (A) in an elastomer, which is a vulcanizate of the rubber composition, as it is or in a state slightly changed, whereby the coexisting nonhalogenated flame retardant (C) is chemically stabilized by the functional group. Therefore, the degree of deterioration of mechanical strength in said elastomer, which is caused by the nonhalogenated flame retardant, becomes little even when the nonhalogenated flame retardant (C) is incorporated in a high proportion, so that the elastomer can be provided as a flame-retardant elastomer having excellent mechanical properties while realizing high flame retardancy though the nonhalogenated flame retardant is used.

In the present invention, it is not essential to use the functional group-containing olefin copolymer (A) solely as an elastomer-forming component, and an ordinary ethylene.α-olefin copolymer (D) having no functional group may also be used in combination with the olefin copolymer (A).

As examples of the ethylene.α-olefin copolymer (D) having no functional group, may be mentioned copolymers comprising a structural unit derived from ethylene and a structural unit derived from an α-olefin compound having 3 to 10 carbon atoms with an optional structural unit derived from a nonconjugated diene compound, which is contained as needed.

As specific examples of the α-olefin compound having 3 to 10 carbon atoms, may be mentioned those mentioned as examples of the α-olefin compound from which the structural unit (a-2) in the component (A) is derived. As specific examples of the nonconjugated diene compound, may be mentioned those mentioned as examples of the nonconjugated diene compound from which the structural unit (a-4) in the component (A) is derived.

When the component (D) is used in combination, a mass ratio ((A)/(D)) of the component (A) to the component (D) is generally 1:99 to 99:1, preferably 1:99 to 50:50, more preferably 3:97 to 30:70.

In this case, the functional group-containing copolymer (A) may be either a high-molecular weight copolymer having a high molecular weight or a low-molecular weight copolymer close to a liquid.

Since the functional group-containing olefin copolymer (A) has high compatibility with other polymers than olefin polymers, other elastomer materials than the olefin polymers, for example, nitrile rubber, chloroprene rubber, chlorinated polyethylene rubber, halogenated butyl rubber, acrylic rubber, ethylene-acrylic copolymer rubber, hydrogenated nitrile rubber, silicone rubber, fluorine-containing rubber, etc., may also be mixed for use with the copolymer (A).

The functional group-containing olefin copolymer (A) can be prepared in the following manner.

The functional group-containing unsaturated compound is first reacted with an organometallic compound (hereinafter referred to as "the specific organometallic compound") comprising a metal selected from metals of Groups 2, 12 and 13 of the periodic table, whereby the functional group in the functional group-containing unsaturated compound is subjected to a masking treatment.

Specific examples of the specific organometallic compound used in the masking treatment include diethylzinc, dibutylmagnesium, ethylmagnesium chloride, butylmagnesium chloride, trimethylaluminum, triethylaluminum, triisobutylaluminum, trihexylaluminum, diisobutylaluminum hydride, diethylaluminum hydride, ethylaluminum dihydride, diethylaluminum ethoxide, ethylaluminum diethoxide, dibutylaluminum ethoxide, dibutylaluminum butoxide, diisobutylaluminum dibutoxide, diisobutylaluminum isopropoxide, diisobutylaluminum 2-ethylhexyloxide, isobutylaluminum butoxide, isobutylaluminum 2-ethylhexyloxide, diethylaluminum chloride, ethylaluminum dichloride, diethylaluminum bromide, ethylaluminum sesquichloride, ethylaluminum dichloride, and methylalumoxane, ethylalumoxane and butylalumoxane obtained by the reaction of water or copper sulfate hydrate with a trialkylaluminum.

Among these, the organoaluminum compounds are preferred. As examples of particularly preferable organoaluminum compounds, may be mentioned trimethylaluminum, triethylaluminum, triisobutylaluminum, diisobutylaluminum hydride, diethylaluminum chloride and ethylaluminum sesquichloride.

The reaction of the functional group-containing unsaturated compound with the specific organometallic compound for the masking treatment is preferably conducted in the presence of an inert solvent or diluent under an atmosphere of an inert gas such as nitrogen gas, argon gas or helium gas.

As the inert solvent or diluent, may be used an aliphatic hydrocarbon such as butane, pentane, hexane, heptane or octane, a cyclic hydrocarbon such as cyclopentane, cyclohexane or methylcyclopentane, or an aromatic compound or halogenated hydrocarbon such as benzene, toluene, xylene, chlorobenzene, dichloroethane or dichloromethane.

In the reaction for the masking treatment, the specific organometallic compound is preferably used in a proportion of at least 0.8 equivalents, more preferably 0.9 to 1.5 equivalents per equivalent of the functional group in the functional group-containing unsaturated compound. If this proportion is too low, a great amount of the functional group remains unmasked, and so the catalytic activity of a polymerization catalyst in a polymerization treatment, which will be described subsequently, may be lowered, not to allow the polymerization reaction to sufficiently proceed in some cases.

The conditions for the reaction of the functional group-containing unsaturated compound with the specific organometallic compound vary according to the kinds of the functional group-containing unsaturated compound and specific organometallic compound used. However, the reaction time is generally 2 minutes to 10 hours, preferably 10 minutes to 2 hours, and the reaction temperature is generally −10 to 60° C., preferably 10 to 40° C.

The functional group-containing unsaturated compound subjected to the masking treatment in such a manner is preferably stored at a temperature of 30° C. or lower until it is subjected to a polymerization treatment. The occurrence of side reactions during the storing can be prevented thereby.

Since an unreacted metal-carbon bond may be present in the functional group-containing compound masked in some cases to make it unstable, a compound having a branched structure, for example, an alcohol such as isopropanol, sec-butanol, tert-butanol or 2-ethylhexanol, or a phenol such as 2,6-di-tert-butylcresol, 2,6-di-tert-butylphenol, 2,6-dimethylcresol or 2,6-dimethylphenol, may also be added to improve the stability during storage.

The functional group-containing unsaturated compound subjected to the masking treatment, which is a raw monomer for the structural unit (a-1), ethylene, which is a raw monomer for the structural unit (a-2), the specific α-olefin compound which is a raw monomer for the structural unit (a-3), and the nonconjugated diene, which is a raw monomer for the structural unit (a-4) and used as needed, are then subjected to a polymerization treatment.

In this polymerization reaction, a polymerization catalyst composed of a transition metal compound, preferably a compound of a metal selected from metals of Groups 4 and 5 of the periodic table, and an organoaluminum compound is used.

As the polymerization catalyst, a catalyst capable of providing a copolymer, in which the respective monomers are arranged at random by comparison, in the copolymerization reaction of the monomer composition for synthesizing the olefin copolymer (A) is preferably used. As specific examples of the catalyst system, may be mentioned the following systems.

(1) A catalyst system composed of a hydrocarbon compound-soluble vanadium compound and an organoaluminum compound, in which at least one chlorine atom is contained in any one of the vanadium compound or organoaluminum compound.

In this catalyst system, an oxygen- or nitrogen-containing electron donor such as an ester of an organic acid or inorganic acid, ether, amine, ketone or alkoxysilane may be additionally added to the vanadium compound or organoaluminum compound.

(2) A catalyst system composed of a titanium halide or zirconium halide carried on silica or magnesium chloride, and an organoaluminum compound.

As the titanium halide or zirconium halide, may be used titanium tetrachloride, titanium tetrabromide, zirconium tetrachloride or the like.

As the organoaluminum compound, may be used trimethylaluminum, triethylaluminum, triisobutylaluminum, methylalumoxane or the like.

In this catalyst system, dioctyl phthalate, tetraalkoxysilane, diphenyldimethoxysilane or the like may be additionally added to the above-described compounds.

(3) A catalyst system composed of a transition metal compound comprising a metal selected from titanium, zirconium and hafnium, which has one or two cyclopentadienyl or indenyl groups forming ligand each having a substituent selected from hydrogen, alkyl groups and allyl group, and an organoaluminum compound containing at least 50 molar equivalents of methylalumoxane.

(4) A catalyst system composed of dichloride of a bisalkyl-substituted or N-alkyl-substituted salicylaldoimine and titanium, zirconium or hafnium, and methylalumoxane (MAO).

The polymerization reaction is preferably conducted in the presence of a proper solvent or diluent. As such a solvent or diluent, may be used, for example, an aliphatic hydrocarbon, alicyclic hydrocarbon, aromatic hydrocarbon or halide thereof. As specific examples thereof, may be mentioned butane, pentane, hexane, heptane, 2-butene, 2-methyl-2-butene, cyclopentane, methylcyclopentane, cyclohexane, isooctane, benzene, toluene, xylene, chlorobenzene, dichloromethane and dichloroethane. These solvents or diluents may preferably be used in a state that the water content has been lowered to 20 ppm or lower by, for example, a distilling treatment or adsorbing treatment.

The polymerization reaction is preferably conducted at a temperature of 0 to 150° C., particularly 10 to 100° C.

In the polymerization reaction, a molecular weight modifier may be used as needed. As specific examples thereof, may be mentioned hydrogen, diethylzinc and diisobutylaluminum hydride.

A reactor used for conducting the polymerization reaction may be any of the batch type and the continuous type. As the continuous type reactor, may be used a tube type reactor, tower type reactor or vessel type reactor.

After the polymerization is conducted in the above-described manner, the resultant copolymer is subjected to a demasking treatment, whereby the functional group-containing olefin copolymer (A) can be obtained.

When a compound, in which the functional group is a hydroxyl, carboxyl, alkoxy, acid anhydride or imide group, is used as the functional group-containing unsaturated compound, the demasking treatment may be conducted by using an acid having a comparatively high acidity, such as formic acid, oxalic acid, fumaric acid, lactic acid, dioctylmonophosphoric acid, trifluoroacetic acid, dodecylbenzenesulfonic acid, nonylphenoxypolyethylene glycol monophosphate, nonylphenoxypolyethylene glycol diphosphate, lauroxypolyethylene glycol monophosphate or lauroxypolyethylene glycol diphosphate.

When a compound, in which the functional group is an amino or amide group, is used as the functional group-containing unsaturated compound on the other hand, the demasking treatment may be conducted by using an alcoholate having a strong basicity, such as an alcoholate of tert-butanol with lithium, sodium or potassium, an alcoholate of amyl alcohol with lithium, sodium or potassium, the lithium, sodium or potassium salt of octanoic acid, or the lithium or potassium salt of nonylphenol, or using phenol or an alkali metal salt of an organic carboxylic acid.

A treatment for removing remaining demasking agent, polymerization catalyst and the like is preferably conducted by passing the thus-obtained copolymer solution containing the olefin copolymer through an adsorption column in which silica, alumina, diatomaceous earth or the like has been packed, or adding a great amount of water, alcohol or the like to the polymer solution to wash it.

A publicly known antioxidant, for example, a phenolic, phosphorus-containing or sulfur-containing antioxidant may be added to the copolymer solution with a view toward improving the stability of the olefin copolymer.

Steam is then blown into the copolymer solution, thereby conducting a removal treatment of the solvent, and solids are then separated from the resulting slurry and dehydrated and dried by means of a screw type squeezer, extruder, heated roll or the like, thereby obtaining the functional group-containing olefin copolymer (A) as a solid. Alternatively, the copolymer solution is heated to concentrate it, and the concentrate is dried by means of a vented extruder, thereby obtaining the functional group-containing olefin copolymer (A) as a solid.

According to the process described above, the functional group in the functional group-containing unsaturated compound is subjected to the masking treatment with the specific organometallic compound. Therefore, such a functional group is exactly masked, and consequently the activity of the polymerization catalyst is prevented from being lowered in the polymerization reaction, and no obstruction to the polymerization reaction is offered. As a result, the intended functional group-containing olefin copolymer (A) can be exactly produced.

The flame-retardant rubber compositions according to the present invention can be prepared by kneading the above-described components (A), (B) and (C), and optionally the component (D) by means of the conventionally known kneading machine, for example, an open roll mill, Banbury mixer or kneader.

The resulting rubber compositions are preferably prepared in such a manner that the Mooney viscosity (ML1+4, 100° C.) thereof falls within a range of 20 to 50.

The flame-retardant rubber compositions thus prepared are formed or molded in any desired forms by an extruder or mold, and then vulcanized by means of a heater such as a high-frequency heater, air oven, PCM or LCM, thereby obtaining elastomer materials or elastomer products which are vulcanizates.

Alternatively, elastomers may also be prepared by a method in which molding and vulcanization are conducted in a mold using a vulcanizer known per se.

According to the flame-retardant rubber compositions described above, the elastomers, which are vulcanizates thereof, come to have flame retardancy because the flame retardant is contained. Since the flame retardant is a nonhalogenated flame retardant, the elastomers themselves are nonhalogenated substances and no obstacle to the human life and moreover have excellent elastic properties and mechanical properties even when the nonhalogenated flame retardant is contained at a high proportion.

Accordingly, the elastomers are excellent in, for example, easiness upon installation and mechanical properties such as impact resistance and fracture resistance, nonhalogenated substances and flame-retardant, and so the elastomers are suitably used in production of elastomer products for building materials, specifically, fireproof sealing materials for window frames, floor covering materials, etc.

EXAMPLES

The present invention will hereinafter be described specifically by the following examples. However, the present invention is not limited to these examples. (Preparation of functional group-containing olefin copolymer (A))

Preparation Example 1

A 3-L separable flask purged with nitrogen was charged with 2,000 mL of hexane and 20 mL of a 0.5 mol/L hexane solution (containing 10 mmol of 5-methyl-5-carboxy-bicyclo[2.2.1]-2-heptene) of 5-methyl-5-carboxy-bicyclo[2.2.1]-2-heptene (MCBH). While stirring this system, 12 mmol of triisobutylaluminum were then added as a catalyst to conduct a reaction at 20° C., thereby masking the carboxyl group in 5-methyl-5-carboxy-bicyclo[2.2.1]-2-heptene.

After 5 mL of 5-ethylidene-2-norbornene (ENB) were added to this system, 30 mL (containing 24 mmol of $Al_2(C_2H_5)_3Cl_3$) of a hexane solution containing $Al_2(C_2H_5)_3Cl_3$ at a concentration of 0.81 mol/L were added as a polymerization catalyst while continuously feeding a gaseous mixture obtained by mixing ethylene at a feed rate of 5.5 L/min, propylene at a feed rate of 4.5 L/min and hydrogen gas at a feed rate of 0.5 L/min, and 24 mL (containing 2.4 mmol of VCl$_4$) of a hexane solution containing VCl$_4$ at a concentration of 0.10 mol/L were then added to conduct a copolymerization reaction of 4 monomers of ethylene, propylene, 5-methyl-5-carboxy-bicyclo [2.2.1]-2-heptene and 5-ethylidene-2-norbornene at 25° C. for 10 minutes.

A butanol solution containing 180 mmol of lactic acid was added to the resultant copolymer solution, and the mixture was stirred for 10 minutes, thereby conducting a demasking treatment.

After 1 L of water was then added to the copolymer solution, and the mixture was stirred for 10 minutes, only the copolymer solution (organic layer) was recovered. The copolymer solution was washed 3 times with 1 L of water, thereby conducting a removal treatment of remaining lactic

Preparation Example 4

A functional group-containing olefin copolymer (A4) shown in Table 1 was prepared in the same manner as in Preparation Example 3 except that the composition of the gaseous mixture was changed by changing the feed rates of ethylene, propylene and hydrogen gas to 5.5 L/min, 4.5 L/min and 5.0 L/min, respectively.

Comparative Preparation Example 1

An olefin copolymer (X1) having no functional group shown in Table 1 was prepared in the same manner as in Preparation Example 1 except that no MCBH was used.

TABLE 1

| | Example | | | | Comparative Example |
|---|---|---|---|---|---|
| Copolymer | 1<br>A1 | 2<br>A2 | 3<br>A3 | 4<br>A4 | 1<br>X1 |
| Structural Unit (a-1) | Ethylene | Ethylene | Ethylene | Ethylene | Ethylene |
| mol % of Structural Unit (a-1) | 66.1 | 64.1 | 64.8 | 64.4 | 66.6 |
| Monomer of Structural Unit (a-2) | Propylene | Propylene | Propylene | Propylene | Propylene |
| mol % of Structural Unit (a-2) | 30.8 | 29.7 | 30.1 | 30.4 | 30.8 |
| Monomer of Structural Unit (a-3) | MCBH | MCBH | MCBH | MCBH | — |
| mol % of Structural Unit (a-3) | 0.23 | 3.3 | 2.3 | 2.4 | — |
| Monomer of Structural Unit (a-4) | ENB | ENB | ENB | ENB | ENB |
| mol % of Structural Unit (a-4) | 2.9 | 2.8 | 2.9 | 2.8 | 2.6 |
| Intrinsic Viscosity [η] (dL/g) | 2.30 | 2.32 | 2.28 | 0.2 | 2.30 |

MCBH: 5-methyl-5-carboxy-bicyclo[2.2.1]-2-heptene
ENB: 5-ethylidene-2-norbornene acid and the like. Thereafter, steam was blown into the copolymer solution, thereby conducting a removal treatment of the solvent. Thereafter, solids were separated from the resultant slurry and dried by means of a heated roll, thereby obtaining 38 g of a functional group-containing olefin copolymer (A1) as a solid.

The functional group-containing olefin copolymer (A1) was analyzed by an infrared absorption spectrometry. As a result, it was found that the content of the structural unit (a-1) derived from ethylene was 66.1 mol %, the content of the structural unit (a-2) derived from propylene was 30.8 mol %, the content of the structural unit (a-3) derived from 5-methyl-5-carboxy-bicyclo[2.2.1]-2-heptene was 0.23 mol %, and the content of the structural unit (a-4) derived from 5-ethylidene-2-norbornene was 2.9 mol %.

The intrinsic viscosity [η] of this copolymer (A1) was 2.30 dL/g as measured in decalin at 135° C.

Preparation Examples 2 and 3

Functional group-containing olefin copolymers (A2) and (A3) shown in Table 1 were prepared in the same manner as in Preparation Example 1 except that amounts of MCBH, triisobutylaluminum as the catalyst for the masking treatment and Al$_2$(C$_2$H$_5$)$_3$Cl$_3$ as the polymerization catalyst in Preparation Example 1 were changed.

Example 1

In a Banbury mixer having an internal volume of 1,700 mL, 100 parts by mass of the thus-obtained olefin copolymer (A1), 30 parts by mass of white carbon (Nipsil VN3, trade name; product of Nippon Silica Industrial Co., Ltd.) as a reinforcing material, 200 parts by mass of magnesium hydroxide (Kisuma 5A, trade name; product of Kyowa Chemical Industry Co., Ltd.) as a nonhalogenated flame retardant, 1 part by mass of stearic acid and 20 parts by mass of process oil (Dyana Process PW380, trade name; product of Idemitsu Kosan Co., Ltd.) as a softening agent were kneaded for 180 seconds under conditions of 60 rpm and 60° C., thereby obtaining a compound material.

To the compound material thus obtained, were added 5 parts by mass of zinc oxide as a vulcanization acceleration aid, 0.2 parts by mass of sulfur as a vulcanizing agent and 7 parts by mass of an organic peroxide (Percumyl D-40, trade name, product of Nippon Oil & Fats Co., Ltd.) as a crosslinking agent, and the resultant mixture was kneaded for 10 minutes by a 10-inch roll kept at 60° C., thereby preparing a compound (1) which is a rubber composition according to the present invention.

Example 2

A compound (2) which is a rubber composition according to the present invention was prepared in the same manner as in Example 1 except that the olefin copolymer (A2) was used in place of the olefin copolymer (A1).

Example 3

A compound (3) which is a rubber composition according to the present invention was prepared in the same manner as in Example 1 except that the olefin copolymer (A3) was used in place of the olefin copolymer (A1).

Example 4

A compound (4) which is a rubber composition according to the present invention was prepared in the same manner as in Example 3 except that the amount of magnesium hydroxide, "Kisuma 5A" as a nonhalogenated flame retardant was changed to 100 parts by mass.

Example 5

A compound (5) which is a rubber composition according to the present invention was prepared in the same manner as in Example 3 except that the amount of magnesium hydroxide, "Kisuma 5A" as a nonhalogenated flame retardant was changed to 300 parts by mass.

Example 6

A compound (6) which is a rubber composition according to the present invention was prepared in the same manner as in Example 1 except that 100 parts by mass of a mixture composed of 10 parts by mass of the olefin copolymer (A4) and 90 parts by mass of an ethylene-propylene-5-ethylidene-2-norbornene copolymer (EP65, trade name, product of JSR Co., Ltd.; ethylene content: 66.6 mol %, propylene content: 30.8 mol %, 5-ethylidene-2-norbornene content: 2.6 mol %; [η]: 2.07 dL/g) was used in place of 100 parts by mass of the olefin copolymer (A1).

Comparative Example 1

A compound (Xa) which is a comparative rubber composition was prepared in the same manner as in Example 1 except that the olefin copolymer (X1) was used in place of the olefin copolymer (A1).

Comparative Example 2

A compound (Xb) which is a comparative rubber composition was prepared in the same manner as in Example 3 except that magnesium hydroxide, "Kisuma 5A" as a nonhalogenated flame retardant was not used.

Each of the compounds obtained in Examples 1 to 6 and Comparative Examples 1 and 2 was subjected to press vulcanization at 170° C. for 30 minutes by a steam vulcanizing and pressing machine to obtain a sheet having a thickness of 2 mm.

Various physical properties of this vulcanized sheet were determined in accordance with the following respective methods. The results are shown in Table 2.

(1) Physical Property Test:

Initial modulus M100 (MPa), tensile strength TB (MPa) elongation $E_B$ (%) at break and hardness (Duro A) of each sample sheet were determined in accordance with JIS K 6251.

The conditions of the tensile test were as follows:

Test temperature 1: room temperature (23±2° C.)

Specimen form: JIS No. 2

Tensile rate: 200 mm/min (2) Flame Retardancy:

An oxygen index was determined in accordance with ASTM D 2863-70.

TABLE 2

| | Example | | | | | | Comparative Example | |
|---|---|---|---|---|---|---|---|---|
| | 1 | 2 | 3 | 4 | 5 | 6 | 1 | 2 |
| Compound | 1 | 2 | 3 | 4 | 5 | 6 | Xa | Xb |
| Olefin Copolymer (A1) | 100 | | | | | | | |
| Olefin Copolymer (A2) | | 100 | | | | | | |
| Olefin Copolymer (A3) | | | 100 | 100 | 100 | | | 100 |
| Olefin Copolymer (A4) | | | | | | 10 | | |
| EP65 | | | | | | 90 | | |
| Olefin Copolymer (X1) | | | | | | | 100 | |
| White Carbon | 30 | 30 | 30 | 30 | 30 | 30 | 30 | 30 |
| Nonhalogenated Flame | 200 | 200 | 200 | 100 | 300 | 200 | 200 | — |
| Stearic Acid | 5 | 5 | 5 | 5 | 5 | 5 | 5 | 5 |
| Process Oil | 20 | 20 | 20 | 20 | 20 | 20 | 20 | 20 |
| Zinc Oxide | 5 | 5 | 5 | 5 | 5 | 5 | 5 | 5 |
| Sulfur | 0.2 | 0.2 | 0.2 | 0.2 | 0.2 | 0.2 | 0.2 | 0.2 |
| Crosslinking Agent | 7 | 7 | 7 | 7 | 7 | 7 | 7 | 7 |
| Vulcanizes Physical Property | | | | | | | | |
| M100 (MPa) | 2.0 | 2.5 | 2.4 | 2.6 | 2.0 | 2.2 | 1.0 | 3.1 |
| $T_B$ (MPa) | 6.2 | 5.8 | 6.4 | 8.1 | 5.8 | 5.1 | 2.9 | 11.3 |
| $E_B$ (%) | 510 | 550 | 530 | 590 | 380 | 520 | 500 | 700 |
| $H_s$ (Duro A) | 72 | 73 | 72 | 68 | 75 | 71 | 70 | 65 |
| Flame Retardancy (Oxygen Index) | 40 | 41 | 40 | 31 | 47 | 41 | 41 | 20 |

It is understood from the results shown in Table 2 that an elastomer exhibiting higher mechanical strength is provided without impairing flame retardancy by a rubber composition comprising the functional group-containing olefin copolymer (A) obtained by using a functional group-containing unsaturated compound as a monomer compared with a rubber composition comprising only an olefin copolymer having no functional group. More specifically, for example, the compound 3 of Example 3 and the compound Xa of Comparative Example 1 contain the nonhalogenated flame retardant in the same proportion, and substantially the same flame retardancy is achieved. According to the compound 3, however, the physical property values of the elastomer are all superior to those of Comparative Example 1.

In Examples 3, 4 and 5, only the proportions of the flame retardant incorporated are different from one another. As the proportion of the flame retardant incorporated is increased, the flame retardancy is enhanced correspondingly. It is however understood that lowering of the physical property values exhibiting mechanical strength other than hardness is little.

Effect of the Invention:

According to the flame-retardant rubber compositions of the present invention, as described above, the olefin copolymer, which is an elastomer-forming component, has a functional group in its structural unit, whereby the coexisting nonhalogenated flame retardant is chemically stabilized. Therefore, the degree of deterioration of mechanical strength in the resultant elastomers, which is caused by the nonhalogenated flame retardant, becomes little even when the nonhalogenated flame retardant is incorporated in a high proportion, so that the elastomers can be thus provided as those having high flame retardancy and excellent mechanical properties.

The elastomers according to the present invention have high flame retardancy and excellent mechanical properties, whereby various elastomer products can be provided making good use of their properties.

What is claimed is:

1. A flame-retardant rubber composition comprising:

(A) an olefin copolymer having a functional group, which comprises (a-1) a structural unit derived from ethylene, (a-2) a structural unit derived from an α-olefin compound having 3 to 10 carbon atoms, (a-3) a structural unit derived from a functional group-containing unsaturated compound, and optionally (a-4) a structural unit derived from a nonconjugated diene compound, and has an intrinsic viscosity(η) of 0.1 to 10 DL/g as measured in decahydronaphthalene at 135° C.;

(B) a vulcanizing agent and/or a crosslinking agent; and (C) a nonhalogenated flame retardant, wherein the structural unit (a-3) in the olefin copolymer (A) having the functional group is derived from a compound represented by the following formula (2)

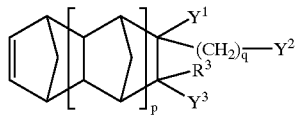

(2)

wherein $R^3$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or a functional group represented by $-OR^2$, $-COOH$, $-NHR^2$ or $-CONHR^2$ ($R^2$ being a hydrogen atom or a hydrocarbon group having 1 to 10 carbon atoms), at least one of $Y^1$, $Y^2$ and $Y^3$ is the functional group, at least two of $Y^1$, $Y^2$ and $Y^3$ may be an acid anhydride group ($-CO-O-CO-$) or an imide group ($-CO-NH-CO-$) formed by being bonded to each other when they are the functional groups, p is an integer of 0 to 2, and q is an integer of 0 to 5.

2. The flame-retardant rubber composition according to claim 1, wherein the functional group of $Y^1$, $Y^2$ and $Y^3$ is a $-COOH$ group.

3. The flame-retardant rubber composition according to claim 1, wherein in the olefin copolymer (A) having the functional group, proportions of the structural unit (a-1), the structural unit (a-2), the structural unit (a-3) and the structural unit (a-4) are 35 to 90 mol %, 5 to 50 mol %, 0.01 to 5 mol % and 0 to 10 mol %, respectively.

4. The flame-retardant rubber composition according to claim 1, which further comprises (D) an ethylene.α-olefincopolymer having no functional group.

5. The flame-retardant rubber composition according to claim 1, wherein the nonhalogenated flame retardant (C) is contained in a proportion of at least 5 parts by mass per 100 parts by mass of the olefin copolymer (A) having the functional group.

6. The flame-retardant rubber composition according to claim 3, wherein the nonhalogenated flame retardant (C) is contained in a proportion of at least 5 parts by mass per 100 parts by mass of the olefin copolymer (A) having the functional group.

7. The flame-retardant rubber composition according to claim 4, wherein the nonhalogenated flame retardant (C) is contained in a proportion of at least 5 parts by mass per 100 parts by mass in total of the olefin copolymer (A) having the functional group and the ethylene.α-olefin copolymer (D) having no functional group.

8. A flame-retardant elastomer obtained by subjecting the flame-retardant rubber composition according to claim 1 to a vulcanizing treatment.

9. A flame-retardant elastomer obtained by subjecting the flame-retardant rubber composition according to claim 4 to a vulcanizing treatment.

10. A flame-retardant elastomer obtained by subjecting the flame-retardant rubber composition according to claim 6 to a vulcanizing treatment.

11. A flame-retardant elastomer obtained by subjecting the flame-retardant rubber composition according to claim 5 to a vulcanizing treatment.

* * * * *